United States Patent [19]

Buchta

[11] 4,295,390

[45] Oct. 20, 1981

[54] MANUAL OVERRIDE CONTROL FOR DOUBLE-ACTING ACTUATOR

[75] Inventor: Ervin A. Buchta, Houston, Tex.

[73] Assignee: FMC Corporation, Chicago, Ill.

[21] Appl. No.: 86,966

[22] Filed: Oct. 19, 1979

[51] Int. Cl.³ .......................... F16H 1/18; F16K 31/00

[52] U.S. Cl. .............................. 74/625; 74/424.8 VA

[58] Field of Search ....................... 74/625, 424.8 VA; 251/14, 130

[56] References Cited

U.S. PATENT DOCUMENTS

| | | | |
|---|---|---|---|
| 2,403,427 | 7/1946 | Ludeman | 251/14 |
| 2,630,829 | 3/1953 | Shafer | 251/14 |
| 2,644,485 | 7/1953 | Schwendner | 251/14 |
| 2,733,041 | 1/1956 | Crookston | 251/14 |
| 2,885,172 | 5/1959 | Natho | 251/14 |
| 2,991,042 | 7/1961 | Natho | 251/14 |
| 3,182,524 | 5/1965 | Knox | 74/625 |
| 3,417,960 | 12/1968 | Stehlin | 251/14 |
| 3,745,855 | 7/1973 | Fawkes | 74/625 |
| 4,189,950 | 2/1980 | Killian | 74/424.8 VA |
| 4,194,718 | 3/1980 | Baker et al. | 74/625 |

FOREIGN PATENT DOCUMENTS

| | | | |
|---|---|---|---|
| 552444 | 1/1923 | France | 251/14 |
| 987081 | 4/1951 | France | 251/14 |

*Primary Examiner*—Lawrence J. Staab
*Attorney, Agent, or Firm*—W. W. Ritt, Jr.; L. B. Guernsey

[57] ABSTRACT

A manual override control for use with a double-acting hydraulic or electric powered valve actuator provides means for selectively moving the actuator rod between its extended and retracted positions in the event of a failure of the primary actuator control means. The override control includes a generally cylindrical housing having an axial passage throughout its length, means for connecting one end of the passage to an actuator housing, a threaded drive nut rotatably mounted in the other end of the passage, a threaded member having a socket portion at one end thereof for releasably connecting it to an actuator rod, and means for rotating the drive nut to move the threaded member, and thus the actuator rod, in an axial direction. When functional operation of the primary actuator control means is restored, the override control can be quickly disconnected from the actuator rod and/or normal operation of the actuator can be resumed.

8 Claims, 16 Drawing Figures

MANUAL OVERRIDE CONTROL FOR DOUBLE-ACTING ACTUATOR

BACKGROUND OF THE INVENTION

1. Field of the Invention

This invention relates to an apparatus for operating a double-acting fluid or electrically powered actuator, and more particularly to a manual control for mechanically extending or retracting an actuator rod in the event of a failure of the primary fluid or electrical means of controlling the actuator.

2. Description of the Prior Art

Double-acting actuators, either hydraulically or electrically powered, are commonly used to open and close various types of valves employed in the testing, production and shutting down of oil and gas wells in the petroleum industry. In such use the actuator is mounted on the well Christmas tree, and the actuator rod is connected to the valve closure element so that axial movement of the rod between its extended and retracted positions results in opening or closing the valve. The hydraulic or electrical power source is usually at a remote location from the well, especially in the case of offshore or subsea wells, and is connected to the actuator by hydraulic or electrical lines that may extend for a considerable distance. If any of these lines are damaged, or if they sufficiently deteriorate, the actuator very likely will malfunction, resulting in a loss of control of the associated valve which thereby could be locked into an open position, thus allowing petroleum products to escape, or in a closed position which would prevent testing the well and/or production of petroleum therefrom.

Prior art override controls for such actuators include apparatus which can be bolted or clamped to the actuator rod when there is a failure in the primary control system, to move the actuator rod, and thus the associated valve, into the desired position. When the primary control system is repaired, the prior art override apparatus must be removed before the actuator can be used in the normal manner. What is needed is an override control that can be installed in working position on the actuator, meanwhile allowing the actuator to be hydraulically or electrically controlled until a failure occurs, at which time the override control can then be used until repairs are completed and normal control is resumed.

SUMMARY OF THE INVENTION

The present invention comprises a manually-powered override control which can be mounted on a double-acting valve actuator without any interferring connection to the actuator rod. The actuator can be hydraulically or electrically controlled in the normal manner with the override control in operating position. In the event of a failure of the hydraulic or electrical operating system, the override control can quickly take over control of the actuator. The override control includes a generally cylindrical housing having an axially extending passage with means at one end for mounting the housing on the actuator, and means for rotatably mounting a threaded drive nut at the other end of the passage. A threaded screw-type member, having a socket at one end for connecting it to the actuator rod, is threaded into the drive nut, and a handwheel or other means of rotation is connected to the drive nut to rotate the nut and thereby advance or retract the threaded member axially along the passage, thus moving the actuator rod and opening or closing the valve to which it is connected.

DESCRIPTION OF THE PREFERRED EMBODIMENT

Figures 1, 2, 3, 4, 5, 6:
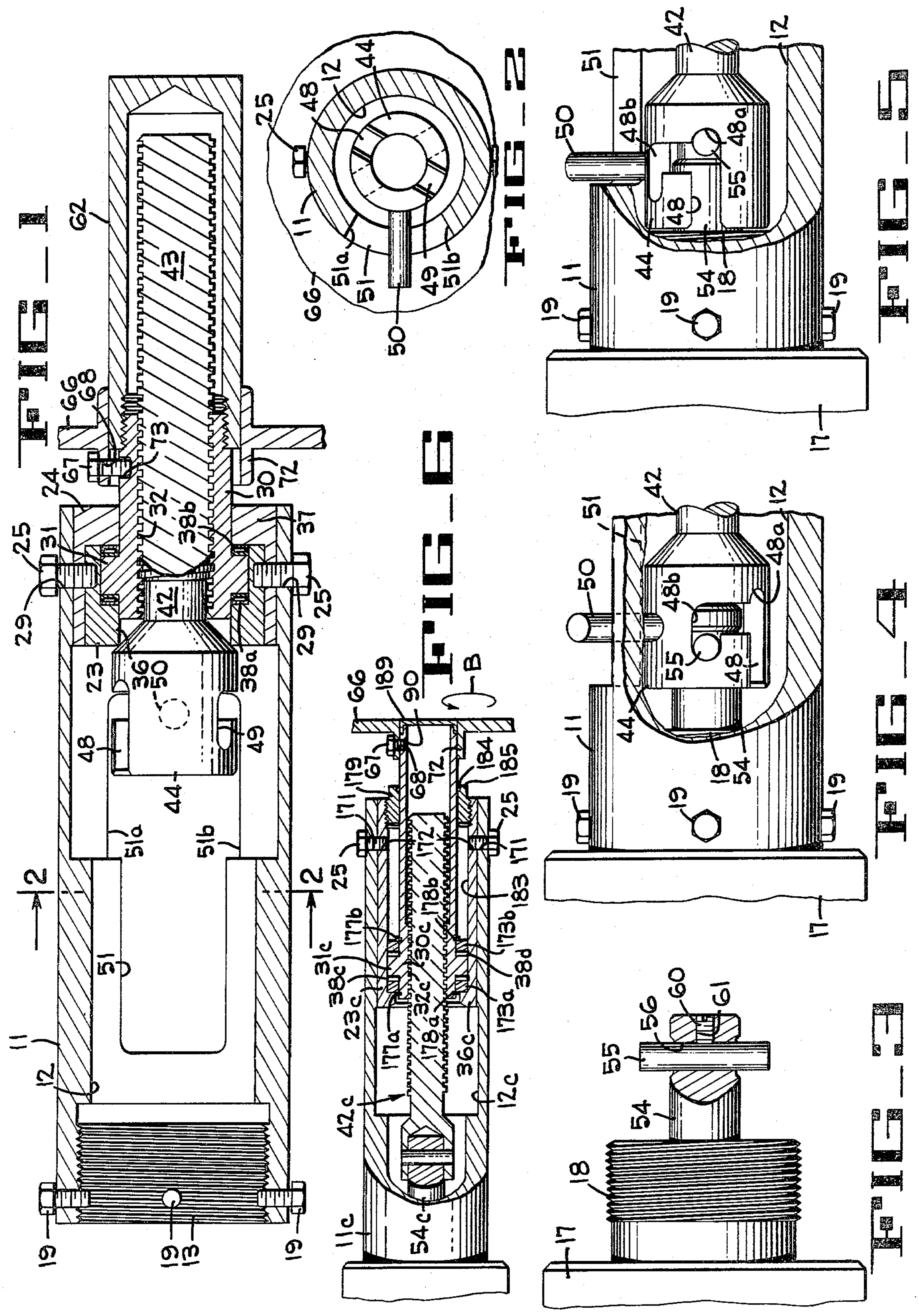
FIG. 1 is a longitudinal section, of one embodiment of a manual override control according to the present invention.
FIG. 2 is a vertical section taken along the line 2—2 of FIG. 1.
FIG. 3 is a side elevation, partially in section, of an end portion of a double acting actuator, showing details of the means for connecting the actuator to the override control of the present invention.
FIGS. 4 and 5 are side elevations, partially in section, of the present invention showing details of the operation of the embodiment of FIG. 1.
FIG. 6 is a side elevation, partially in section and on a reduced scale, of another embodiment of the invention, showing details of the means for connecting the override control to a double-acting actuator while allowing normal hydraulic or electrical control of the actuator.

A manual override control for a double-acting hydraulic or electrically powered valve actuator according to the present invention comprises an elongated outer control housing 11 (FIGS. 1, 2, 4 and 5), with an axial passage 12 (FIG. 1) extending therethrough and having internal screw threads 13 for connecting the housing to a double-acting actuator 17 (FIGS. 3–5). The right end portion of the actuator 17 (FIG. 3) includes external screw threads 18 onto which the housing 11 is threaded and then locked in position by a plurality of set screws 19.

A pair of annular bearing support members 23, 24 are mounted in the right end portion of the passage 12 (FIG. 1) and are retained in position by a pair of shearable set screws 25 each extending through a threaded hole 29 in the housing 11 and into members 23,24. An annular drive nut 30, having a radial outward flange 31 and a threaded bore 32, is rotatably mounted with the flange 31 between a radial inward flange 36 on the support member 23 and a radial inward flange 37 on the support member 24. A plurality of needle or other rollable bearing means **38*a* is positioned between the flanges 31 and 36, and another plurality of similar needle roller bearings 38*b* is positioned between the flanges 31 and 37**.

A screw-type threaded member 42, having a cylindrical threaded shank 43 rotatably mounted in the threaded bore 32 of the drive nut 30, includes an enlarged socket portion 44 having a pair of J-slots 48,49 therein. A handle 50 (FIGS. 1, 2, 4 and 5), threaded or otherwise connected to the outer surface of the socket portion 44, extends radially outward from the socket portion through a slot 51 (FIGS. 1 and 2) in the side of the housing 11, with the upper and lower ends of the slot 51 defined by the edges **51*a*,51*b* respectively. The socket portion 44 is adapted to slip over an actuator rod 54 (FIGS. 3–5) extending axially outward from the end of the actuator 17. A pin 55, mounted transversely through a bore 56 (FIG. 3) in the actuator rod 54 and secured in place by set screw 60 mounted in a threaded axial bore 61, slides into the J-slots 48,49 (FIGS. 1, 2, 4 and 5) when the socket portion 44 (FIGS. 1, 2, 4 and 5) is positioned about the actuator rod 54**.

A cylindrical protective cap 62 (FIG. 1), threaded to the outer end of the drive nut 30, seals out dirt, dust and protects the threaded shank 43 from damage. A handwheel 66 (FIG. 1) is mounted around the protective cap 62 (FIG. 1) and secured to the drive nut 30 by one or more set screws 67, each of which extends through a threaded hole 68 in a wheel flange 72 and into a bore 73 in the drive nut 30, to facilitate rotation of the drive nut.

The threaded member 42 and the socket portion 44 move axially toward the actuator rod 54 when the handwheel 66, as viewed in FIG. 2, is rotated counterclockwise. The action of gravity on the handle 50 and friction between the threaded bore 32 of the drive nut 30 and the threaded shank 43 causes the handle 50 to ride along the lower slot edge **51*b* as the handwheel 66 is rotated counterclockwise, thereby aligning the entrance to the J-slots 48,49 with the pin 55 (FIGS. 2–5) and causing the pin 55 to move into position in these slots (FIG. 5) as the socket member moves near the actuator 17. When the handle 50 is moved upward, i.e., clockwise (FIG. 2), against the upper edge 51*a* of the housing slot 51, the pin 55 (FIG. 4) moves into the notch 48*b* of the J-slot. When the pin 55 is in notch 48*b* a clockwise rotation of the handwheel 66 (FIG. 2) moves the threaded member 42 and the socket portion 44 away from the actuator 17, thereby pulling the actuator rod out of the actuator 17** into the rod's extended position.

To disengage the socket portion 44 from the actuator rod 54 the handwheel 66 is again rotated counterclockwise (FIG. 2) until the pin 55 (FIG. 4) moves axially away from the notch **48*b*. The handle 50 (FIG. 2) is then rotated counterclockwise until it rests against the slot edge 51*b* and the pin 55 moves into the J-slot adjacent the notch 48*a*. The handle 50 is held against the slot edge 51*b* while the handwheel is then rotated clockwise to move the socket portion 44 away from the actuator 17 and move the pin 55 out of the J-slots 48,49**.

Hydraulic or electrical operation of the actuator can be resumed when repairs are completed on the primary control system. If the human operator should forget to disconnect the socket portion 44 from the actuator rod 54 before such primary control operation of the actuator is resumed, axial movement of the actuator rod causes corresponding axial movement of the threaded member 42 and of the bearing support members 23,24, thus shearing the set screws 25 (FIGS. 1 and 2) and allowing further unrestricted axial movement of the actuator rod.

A second embodiment of the present invention is illustrated in FIGS. 7–11. This embodiment differs from that of FIGS. 1–5 by the inclusion of a different means for connecting the actuator rod to the threaded member of the override control. A threaded member **42*a* includes a socket portion 44*a* with a cylindrical inner member 78 having an outwardly extending annular flange 79 (FIGS. 7 and 10) at the right end, and having a plurality of tapered radial extending holes 80 circumferentially positioned around the left end portion. A plurality of spherical balls 84, each positioned on one of the tapered holes 80, are too large to move through the radially inward end of the holes 80, but can move in and out of the radially outward end of the holes. A cylindrical sleeve 85, slidably mounted around the left end of the portion of the inner member 78 (FIGS. 7, 10 and 11), includes an annular inner groove 86 having a tapered surface 90 between a larger diameter portion 91 and a smaller diameter portion 92. When the small diameter portion 92 of the groove is adjacent the balls 84 (FIGS. 7 and 11) the balls are pressed into the holes 80 with a portion of each ball protruding through the radially inward end of its hole 80. The sleeve 85 is biased away from the radial flange 79 of the inner member 78 by a compression spring 97 having one end bearing against the flange 79 and having the other end bearing against the end of the sleeve 85. A handle 50*a* is mounted in a threaded bore 98 (FIGS. 7 and 11) in the sleeve 85 and extends radially outward through an axially extending slot 102 in the housing 11*a*. A pin 103 (FIGS. 7–11) is mounted in a threaded bore 104 in the inner element 78 and extends radially outward through an L-shaped slot 108 in the sleeve 85 and through an axially extending slot 109 in the housing 11*a***.

Figures 7, 8, 9, 10, 11:
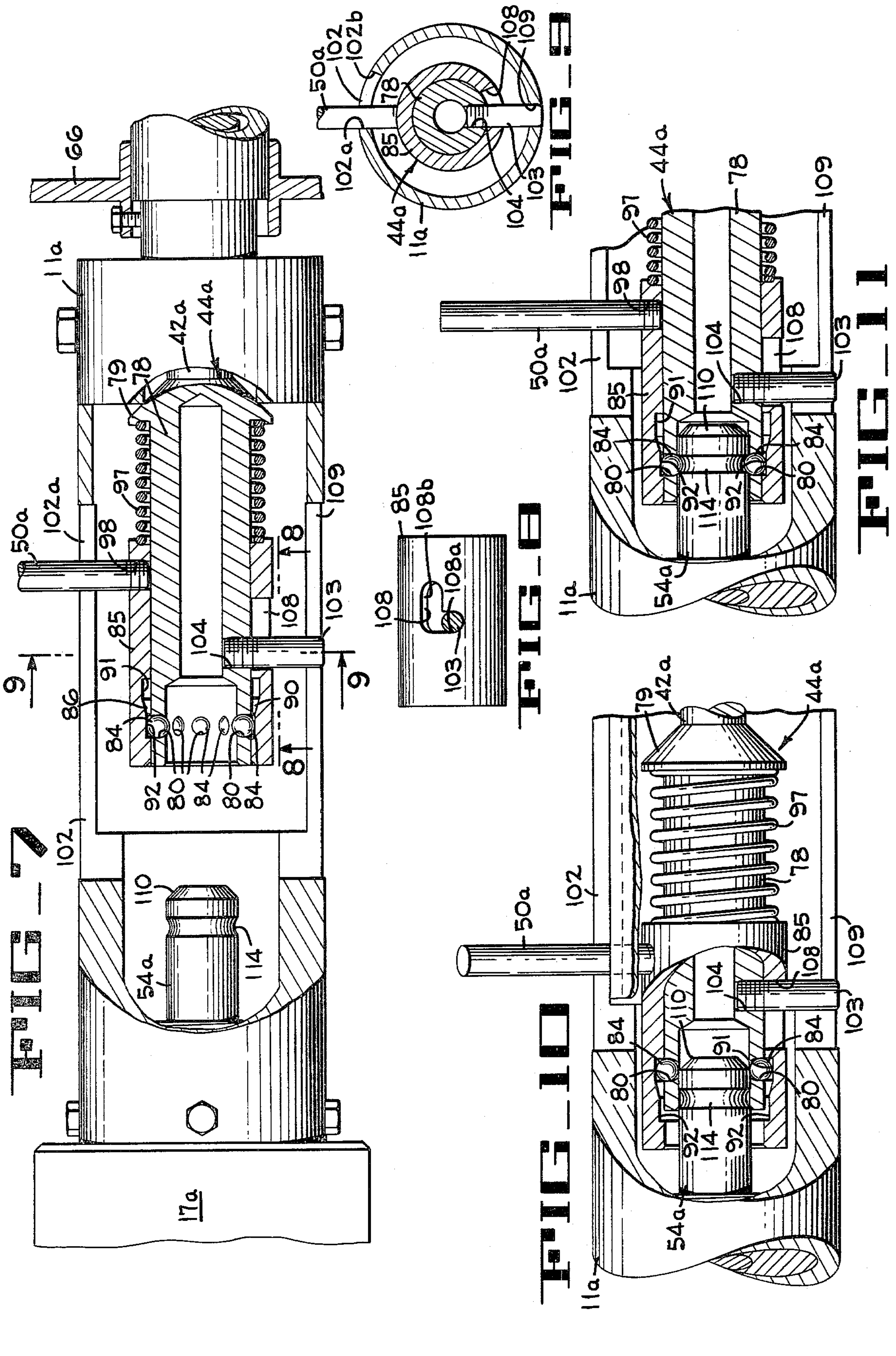
FIG. 7 is a side elevation, partially in section, of another embodiment of the present invention connected to a double-acting actuator. Portions of this view which are identical with the apparatus of FIG. 1 have been omitted.
FIG. 8 is a view taken along the line 8—8 of FIG. 7.
FIG. 9 is a view taken along the line 9—9 of FIG. 7.
FIGS. 10 and 11 are each side elevations, partially in section, of a portion of the embodiment of the invention shown in FIG. 7, illustrating the operation of the override control.
Figure 14:
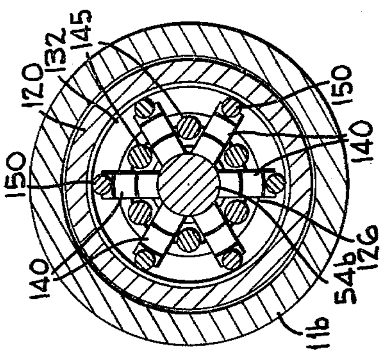
FIG. 14 is a view taken along the line 14—14 of FIG. 12.

The socket portion **44*a* of the override control is moved in an axial direction in the housing 11*a* by rotating the handwheel 66 as was described hereinbefore with the first embodiment of the present invention. As the socket 44*a* moves axially toward the actuator rod 54*a* (FIG. 7) the handle 50*a* is held against the edge 102*a* (FIGS. 7 and 9) of the slot 102, causing the rod 103 to extend through the portion 108*a* (FIG. 8) of the slot 108 and causing the groove 92 (FIG. 7) to retain the balls 84 at the radially inward portion of the holes 80. To allow the socket 44*a* to move on to the actuator rod 54*a*, the handle is moved clockwise (FIG. 9) against the edge 102*b* of the slot 102 and the handle is also moved axially toward the actuator 17*a* causing the sleeve 85 to slide along the inner member 78 to the position shown in FIG. 10 and with the pin 103 at position 108*b* in the L-shaped slot 108 (FIG. 8). The balls 84 are forced radially outward by a cam surface 110 (FIGS. 7 and 10) as the socket 44*a* moves toward the left and around the actuator rod 54*a*. Further axial movement of the socket 44*a* toward the actuator 17*a* allows the balls 84 to move into a groove 114 (FIGS. 7, 10 and 11). When the handle 50*a* is moved counterclockwise against the edge of the slot and the spring 97 is compressed, the sleeve 85 moves to the right (FIG. 11) with the pin 103** at position 108*a* of the slot 108, causing the tapered surface 90 of the groove 86 to press the balls 84 into the actuator rod groove 114 and to lock the socket 44*a* securely to the actuator rod 54*a*. Rotating the handwheel 66 moves the actuator rod 54*a* to either the extended or retracted position as desired.

A third embodiment of the present invention is disclosed in FIGS. 12–15. This embodiment differs from those of FIGS. 1–5 and 7–11 by the inclusion of a different means for connecting the actuator rod to the threaded member of the override control. A socket portion 44*b* of the third embodiment includes a cylindrical outer sleeve 120 (FIGS. 12 and 15) threaded to an end portion 121 of the member 42*b* and having an axially extending bore 122. A cylindrical inner sleeve 126, having a radially outward flange 127 at one end thereof and a sloping cam surface 128 at the other end, is slidably mounted for axial movement in the bore 122. An annular tapered retainer sleeve 132, having a radially inward flange 133, is mounted between the left end of the end portion 121 and a shoulder 134 on the outer sleeve 120. The inner sleeve 126 is biased toward the right against the threaded member 42*b* (FIGS. 12 and 15) by a helical compression spring 138 positioned between the retainer sleeve 132 and the flange 127. A handle 50*b*, mounted in a threaded bore 98*b* in the sleeve 126 and extending radially outward through a slot 159 in the member 42*b* and through a slot 139 in the housing 11*b*, facilitates sliding the inner sleeve axially in the bore 122. A pin 103*b*, projecting through a slot 109*b* in the housing 11*b* and mounted in a threaded bore 104*b* in the sleeve 121, prevents rotation of the sleeve inside the housing 11*b*.

Figure 16:
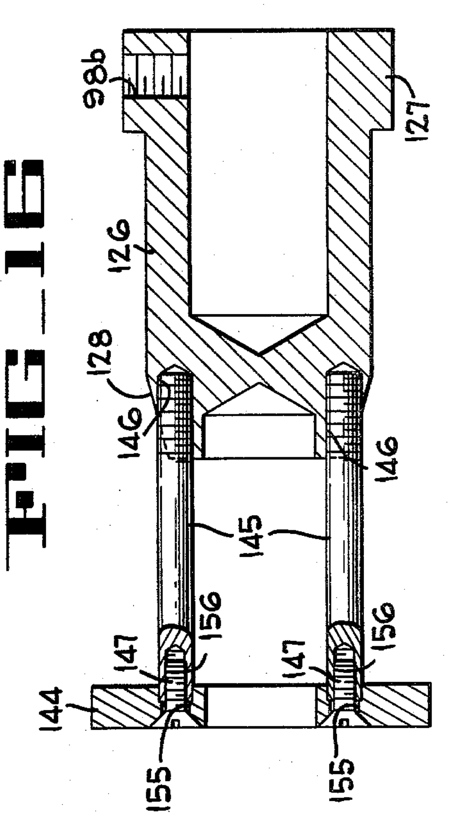
FIG. 16 is a side elevation of a portion of the embodiment shown in FIG. 12, illustrating details of the connection of various internal parts.
Figure 15:
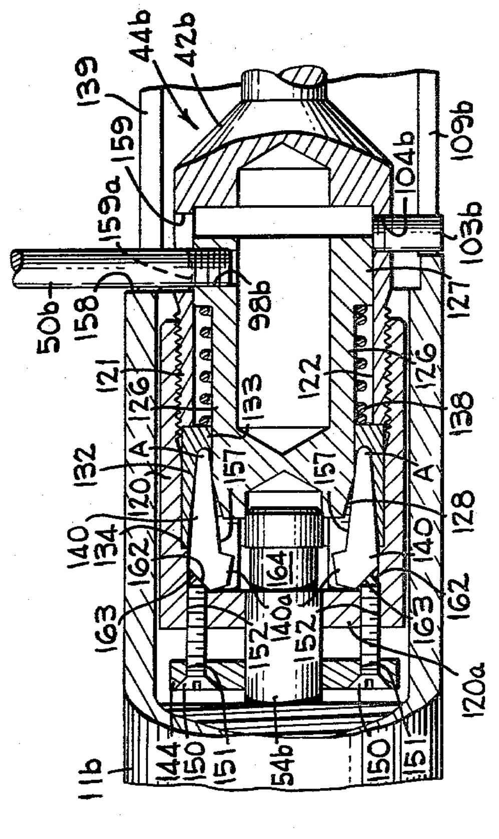
FIG. 15 is a side elevation of a portion of the embodiment shown in FIG. 12, illustrating operation of the override control.

A plurality of latching dogs 140 (FIGS. 12, 14 and 15) are spaced around an actuator rod 54*b* between the inner sleeve 126 and the retainer sleeve 132, with each of the dogs pivoted about an axis A at the right end thereof. An annular plate 144 (FIGS. 12, 15 and 16) is connected to the left end of inner sleeve 126 by a plurality of tie rods 145 (FIGS. 13, 14 and 16) each having one end thereof mounted in a threaded bore 146 (FIG. 16) in the end of the inner sleeve 126, and having the other end thereof secured to the plate 144 by a plurality of screws 147 each extending through a bore 155 in the plate 144 and threaded into a bore 156 in one of the rods 145. A plurality of screws 150, each fixed in a threaded bore 151 to the plate 144 (FIGS. 12 and 15), slidably extend through holes 152 in a radially inward extending flange 120*a* in the sleeve 120, and thence into the area adjacent the latching dogs 140.

Figure 12:
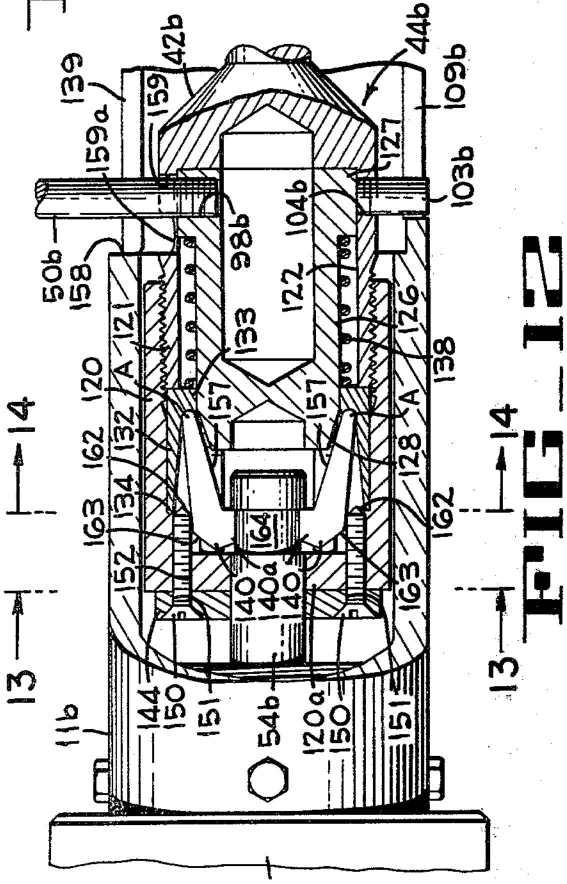
FIG. 12 is a side elevation, partially in section, of another embodiment of the override control of the present invention connected to a double-acting actuator. Portions of this view which are identical with the apparatus of FIG. 1 have been omitted.
Figure 13:
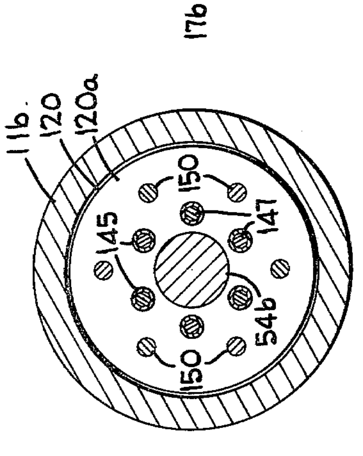
FIG. 13 is a view taken along the line 13—13 of FIG. 12.

In order to connect the socket portion 44*b* of the manual override control to an actuator rod 54*b*, the handle 50*b* and the sleeve 126 are moved toward the left (FIG. 12) causing the inner sleeve 126 to spread the latching dogs 140 radially outward, and the handwheel 66 (FIGS. 1 and 7) rotated as described hereinbefore to move the socket portion 44*b* toward the actuator 17*b* (FIG. 12). As the handle 50*b* and the sleeve 126 are moved from a "locked" position shown in FIG. 12 toward an "unlocked" position shown in FIG. 15 the cam surface 128 on the sleeve 126 moves over a cam surface 157 on the dogs 140, forcing each of the latching dogs 140 to pivot radially outward to an unlocked position. As the inner sleeve 126 moves toward the unlocked position, the tie rods 145 move the plate 144 and the screws 150 toward the left (FIGS. 14 and 15) to pull the screws 150 away from the latching dogs 140.

When the handle 50*b* reaches the unlocked position at the end 158 of the slot 139 (FIGS. 12 and 15), the handle 50*b* should be moved (by hand) out of a notch 159*a* and the left end of the slot 159, allowing the spring 138 to move the inner sleeve 126 against the threaded member 42*b*. The sleeve 126 and the tie rod 145 move the plate 144 and the screws 150 toward the right, causing a cam surface 162 on the screw 150 to slide over a cam surface 163 on the latching dogs 140 to pivot the latching dogs radially inward and force a radial inward flange 140*a* of the dogs into a groove 164 to lock the dogs 140 to the actuator rod 54*b*.

The socket portion 44*b* of the override control can be quickly disconnected from the actuator 17*b* by moving the handle 50*b* toward the left causing the inner sleeve 126 to move the latching dogs 140 out of the groove 164 in the actuator rod 54*b*. The handwheel (FIGS. 1 and 7) can be rotated to move the socket portion 44*b* of the override control away from the actuator rod, and hydraulic or electrical operation of the actuator can be resumed when the hydraulic or electrical system is functioning properly.

A fourth embodiment of the present invention is illustrated in FIG. 6. This embodiment differs from that of FIGS. 1–5 by the inclusion of means for permanently connecting the actuator rod 54*c* to the threaded member 42*c* of the override control, and means for slidably mounting a drive nut 30*c* in the override control housing 11*c*. A bearing support member 23*c*, having a radially inwardly extending flange 36*c* at the left end thereof, is mounted in a passage 12*c* and retained in position by a pair of shearable set screws 25 each of which is threaded into a bore 171 in the outer housing 11*c* and extends into a bore 172 in the support member 23*c*. The annular drive nut 30*c*, having a radial outward flange 31*c* and a threaded bore 32*c*, is rotatably mounted with the flange 31*c* between a pair of annular bearing rings 173*a*,173*b*. A plurality of needle roller bearings or other bearing means 38*c* are mounted between the flange 31*c* and the bearing ring 173*a*, and another plurality of similar needle roller bearings 38*d* are mounted between the flange 31*c* and the bearing ring 173*b*. The bearing rings 173*a*,173*b* are retained in position by a pair of annular retainer rings 177*a*,177*b* mounted in a pair of annular grooves 178*a*,178*b* respectively.

An annular sleeve 179, threaded to the right end of the bearing support, limits the axial travel of the bearing ring 173*b* and the drive nut 30*c*. The drive nut 30*c*, the bearing rings 173*a*,173*b* and the roller bearings 38*c*,38*d* are all slidably mounted in a passage 183 and are axially movable in the passage with the bearing ring 173*a*, 173*b* and the nut flange 31*c* movable in the space between the threaded sleeve 179 and the radial flange 36*c* of the bearing support 23*c*. An annular seal 184 between the drive nut 30*c* and a shoulder 185 of the threaded sleeve seals out foreign matter from the passage 183, and a protective cap 189 threaded to the end of the drive nut 30*c* seals out foreign matter from the end of the drive nut. The handwheel 66 is connected to the drive nut 30*c* by one or more set screws 67 each extending through a threaded hole 68 in the wheel flange 72 and secured to a bore 90 in the drive nut 30*c*, to facilitate rotation of the drive nut.

When the handwheel is rotated counterclockwise (as viewed in the direction of the arrow B) the drive nut 30*c*, the bearing rings 173*a*,173*b* and the bearings 38*c*,38*d* move to the left (FIG. 6) until the bearing ring 173*a* contacts the radial flange 36*c*. Further counterclockwise rotation of the handwheel moves the threaded member 42c and the actuator rod 54c toward the right (FIG. 6), moving the rod 54c into the extended position. A clockwise rotation of the handwheel moves the bearing rings 173a, 173b and drive nut 30c to the right in the passage 183 while the actuator rod 54c remains extended. When the bearing ring 173b moves to a position near the threaded sleeve, hydraulic operation of the repaired actuator can be resumed with the bearing rings 173a,173b and the flange 31c of the drive nut movable axially back and forth in the passage 183 between the flange 36c and the threaded sleeve 179.

To manually move the actuator rod 54c (FIG. 6) of a disabled actuator from an extended position to a retracted position, the handwheel 66 is rotated clockwise until the bearing ring 173b contacts the threaded sleeve 179. Further clockwise rotation of the handwheel 66 and the drive nut 30c moves the threaded member 42c and the actuator rod 54c to the left toward the retracted position. Reversing the rotation of the handwheel moves the bearing ring 173a to a position near the flange 36c and allows operation of a repaired actuator with the bearing rings 173a,173b and the flange 31c of the drive nut movable in the passage 183.

If a human operator should forget to move the bearing rings 173a,173b away from either the flange 36c or the threaded sleeve 179 before hydraulic operation is resumed, movement of the actuator rod 54c may force the bearing rings 173a,173b against either the flange 36c or the sleeve 179 providing an axial force on the bearing support member 23c which will shear the screws 25 and permit hydraulic operation of the actuator 17c.

The present invention provides means for selectively connecting a manual override control to a hydraulic or electric actuator to operate the actuator in the event of a failure of the normal hydraulic or electric control system. The manual override can be quickly connected to the actuator in an emergency and can be quickly disconnected when normal operation is restored.

Although the best mode contemplated for carrying out the present invention has been herein shown and described, it will be apparent that modification and variation may be made without departing from what is regarded to be the subject matter of the invention.

What is claimed is:

1. A manual override control for operating a double acting actuator having an actuator housing and an actuator rod with a distal end of said rod projecting from one end of said actuator housing, said override control comprising:

a generally cylindrical housing having an axially extending passage;

means for connecting said one end of said actuator housing into a first end of said passage;

a threaded drive nut;

means for mounting said drive nut in said passage;

a threaded member having a socket at one end thereof, said socket having a J-slot therein and means for threading said threaded member to said drive nut;

a pin mounted transversely through said actuator rod, said pin extending radially outward from said actuator rod for movement into said J-slot for selectively connecting said socket to said actuator rod; and means for rotating said drive nut to move said threaded member and said socket axially along said passage and to move said actuator rod between an extended and a distended position when said socket is connected to said actuator rod.

2. A manual override control as defined in claim 1 including a plurality of bearing means mounted between said cylindrical housing and said threaded drive nut.

3. A manual override control as defined in claim 1 including a handwheel and means for securing said handwheel to said drive nut to rotate said nut as said handwheel is rotated.

4. A manual override control as defined in claim 1 including a handle connected to said socket to facilitate moving said pin into and out of said J-slot to connect and disconnect said socket from said actuator rod.

5. A manual override control for selectively operating a double-acting actuator, said actuator having an actuator housing and an actuator rod with a distal end projecting from said actuator housing comprising:

laterally directed connector means on said rod distal end;

a control housing having an internal passage and a laterally directed aperture;

means for detachably connecting said control housing to said actuator housing to dispose said passage in axially aligned and surrounding relation to said rod distal end;

a threaded member having a socket portion at one end thereof for receiving said rod distal end therewithin;

means for mounting said threaded member to said control housing for axial movement in said passage;

said socket portion having means for releasably engaging said rod distal end connector means;

operating means for said engaging means including a handle member carried by said socket portion and extending laterally through said control housing aperture;

means for mounting said threaded member and said socket portion in said control housing to facilitate removing said override control from said actuator as a single unit, said actuator being operable with said override control removed; and, means for moving said threaded member in said passage to selectively move said actuator rod relative to said actuator housing when said socket portion has said rod distal end received therein and engaged therewith upon operation of said laterally directed handle member.

6. The manual override control of claim 5 wherein said laterally directed connector means is a transversely extending pin secured to said rod, said engaging means of said socket portion includes a J-slot therein for cooperative engagement with said pin, and said socket portion is mounted for rotation by said handle member for effecting said cooperative engagement.

7. The manual override control of claim 5 wherein said laterally directed connector means is a peripheral groove on said rod, said engaging means of said socket portion includes a series of locking balls mounted for radial movement therein, and further includes a sleeve mounted on said socket portion for axial shifting movement by said handle member and having cam surfaces for shifting said balls into said groove.

8. The manual override of claim 5 wherein said laterally directed connector means is a peripheral groove on said rod, said engaging means of said socket portion includes a series of locking dogs mounted for pivotal movement therein, and further includes a sleeve mounted on said socket portion for axial shifting movement by said handle member and having cam surface for pivoting said dogs into and from said groove.

* * * * *